UNITED STATES PATENT OFFICE.

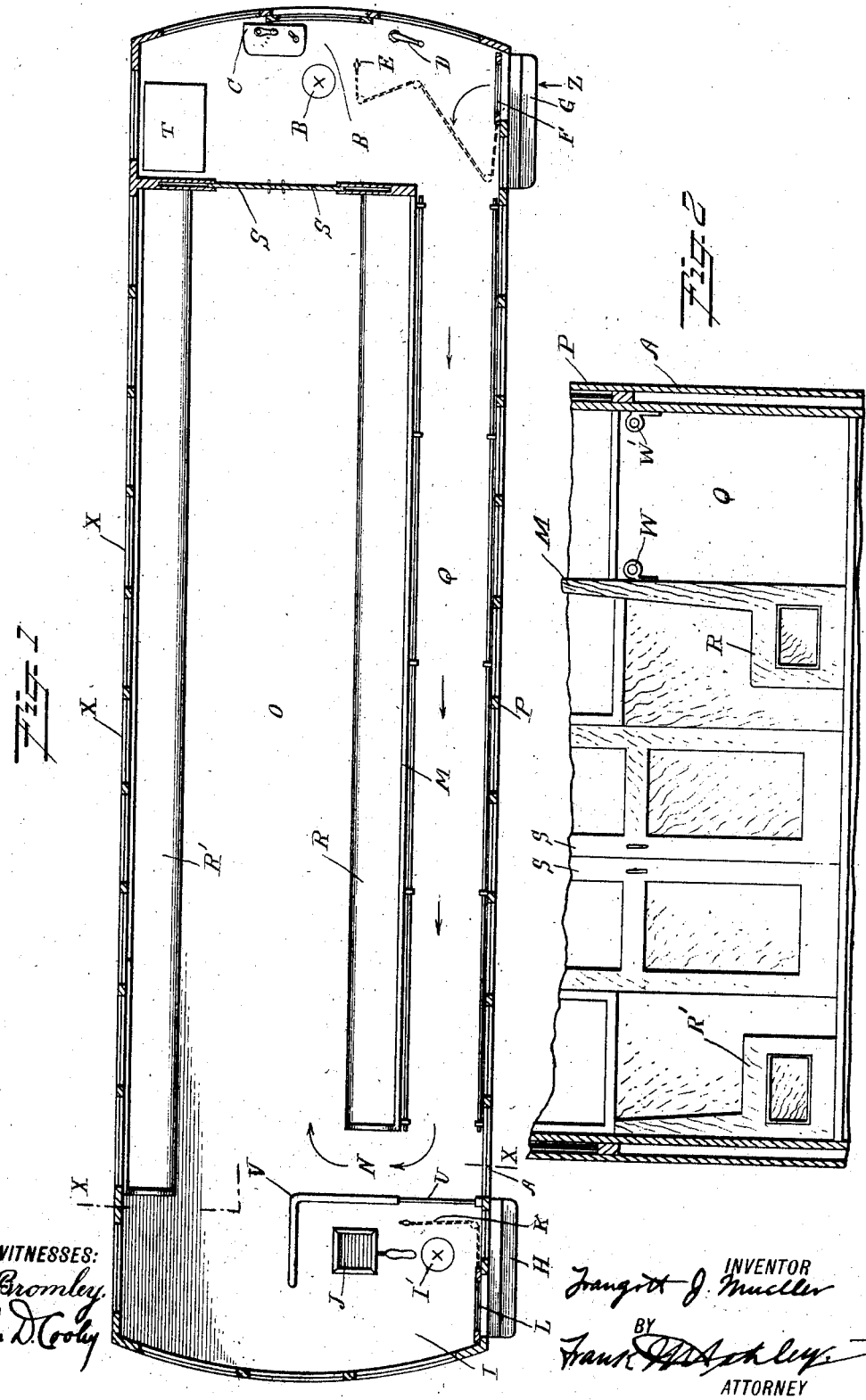

TRAUGOTT J. MUELLER, OF NEWARK, NEW JERSEY.

STREET-CAR.

964,929.  Specification of Letters Patent.  Patented July 19, 1910.

Application filed March 9, 1910. Serial No. 548,309.

*To all whom it may concern:*

Be it known that I, TRAUGOTT J. MUELLER, citizen of the United States, and a resident of Newark, in the county of Essex and State of New Jersey, have invented certain new and useful Improvements in Street-Cars, of which the following is a specification.

My invention relates to street cars and the object of my invention is to provide a car of the type known as a pay-within car, and so arranged and constructed that the person or persons enter the car by the door located at the side of the car near the front end thereof and leave the car at a door located near the rear end thereof.

Heretofore in cars of this type, it has been customary for the passengers to enter the car at the rear door which opens in a vestibule and when a number of persons desire to enter the car at the same time, the vestibule is found to be too small to hold more than three or four passengers at a time and in the event that the conductor is unable to make change rapidly, the car is unable to proceed on its journey, due to the fact that it must wait until the passengers remaining on the street and desiring to enter the car, have entered the same, as will be readily understood.

The object of my invention is to obviate this delay and to provide a space exclusive of the vestibules in which a greater number of passengers may stand within the car and the car can proceed on its journey, while the conductor is making the necessary change and passing the passengers to the compartment containing the seats.

In carrying out my invention I provide a car, having two vestibules, one located at the front end and one at the rear end thereof, and a door opening into the front vestibule which is controlled by the motorman and a door opening into the rear vestibule which is controlled by the conductor.

Extending from the front vestibule to the rear vestibule is a passage which is partitioned off from the compartment containing the seats and through which passage the passengers must pass before they can enter the compartment containing said seats.

Referring to the drawings which form a part of this specification, Figure 1 is a plan view of a car embodying my invention, and Fig. 2 is a cross sectional view on line Z through said car.

A indicates the car which is constructed to travel in one direction only, though it may be arranged to travel in both directions by providing the necessary specific features of the construction.

The motorman's compartment is indicated by B, and the position in which the motorman stands is indicated by B'.

C indicates the control mechanism, D the direct lever and E the means by which the motorman opens and closes the front door F.

G indicates the steps of the car leading to the motorman's vestibule, I indicates the conductor's vestibule and I' the position in which he stands to control the cash box J.

K indicates the mechanism by means of which the conductor operates the rear door L, through which the passengers leave the car.

M is a partition which extends from the front vestibule to the rear vestibule and the entrance N to the seating compartment O.

P indicates one side of the car. Between the side P and partition M is a passage indicated by Q leading from the motorman's vestibule to vestibule I and compartment O.

R and R' indicate seats which extend longitudinally of the car and S—S indicate sliding doors which are usually kept locked so that the passengers cannot leave or enter the car through same.

T indicates a stove or heater.

U indicates a sliding bar controlling communication between the passage Q and vestibule I which bar leads into a hollow pipe partition indicated by V.

W and W' indicate railings which extend along the sides of the passageway Q and are fastened respectively to the partition M and side of the car P.

The car is provided with the usual windows on each side indicated by X—X, etc.

It is obvious that the seats may be arranged in a different manner from that shown in the compartment O and it is also obvious that the passageway Q might be arranged between proper railings or partitions which could extend from vestibule to vestibule through the center of the car, and arranged to have seats on each side of said passageway whereby the same result could be attained, namely to cause the passengers to enter the car and provide a passageway in which they can stand and their fares collected before being permitted to reach the seats provided for passengers, therefore, I do not wish to be limited to the specific construction shown or the specific location of said passageway in the car, but

What I claim and desire to secure by Letters Patent is:

1. A car of the character described having a door-way at its front end and a door-way at its rear end, a passage-way leading from said first door to said second door, and a compartment containing seats for passengers in normal open communication with said passage-way at one end of the car only.

2. A car of the character described having two vestibules, a door opening into each of said vestibules, a compartment containing seats for passengers, and a separate passage-way extending between said vestibules and leading to said compartment and in normal open communication therewith at one end only, each of said doors being provided with means for operating same located within their respective adjacent vestibules.

3. A car of the character described comprising a vestibule for the motorman and a vestibule for the conductor, a compartment having seats for the passengers and a separate passage-way from one of said vestibules to the other and communicating with said compartment at the end adjacent to the conductor's vestibule only.

4. A car of the character described comprising a vestibule for the motorman and a vestibule for the conductor, a compartment having seats for the passengers, and a separate passage-way having railings extending from one of said vestibules to the other and normally communicating at one end only with said compartment, said end being that in which the conductor's vestibule is located.

5. A car of the character described having two vestibules, a door opening into each of said vestibules, a compartment containing seats for passengers, a passage-way extending between said vestibules and leading to said compartment, each of said doors being provided with means for operating same located within their respective adjacent vestibules, and a separate railing provided with a movable bar or door located in one of said vestibules.

6. A car of the character described having two vestibules, a door opening into each of said vestibules, a compartment containing seats for passengers, a passage-way extending between said vestibules and leading to said compartment, each of said doors being provided with means for operating same located within their respective adjacent vestibules, a separate railing provided with a movable bar or door located in one of said vestibules, and a cash depositing device located in one of said vestibules.

7. A car of the character described having a vestibule at each end thereof, and a door at each end thereof, the door at the forward end of the car being constructed to be controlled by the motorman and the door at the opposite end being constructed to be controlled by the conductor, a compartment having seats, a separate passage-way extending along one side of the car from one vestibule to the other and communicating with said compartment at the rear end of the car, and a railing located between said passage-way and the door on the rear vestibule.

8. A car of the character described having a vestibule at each end thereof, and a door at each end thereof, the door at the forward end of the car being constructed to be controlled by the motorman and the door at the opposite end being constructed to be controlled by the conductor, a compartment having seats, a separate passage-way, extending along one side of the car from one vestibule to the other and communicating with said compartment at the rear end of the car, a railing located between said passage-way and the door on the rear vestibule, said partition having a movable portion to permit the exit of a passenger directly from said passage-way to the door of said compartment.

9. A car of the character described having a vestibule at each end thereof, and a door at each end thereof, the door at the forward end of the car being constructed to be controlled by the motorman and the door at the opposite end being constructed to be controlled by the conductor, a compartment having seats, a separate passage-way extending along one side of the car from one vestibule to the other and communicating with said compartment at the rear end of the car, a railing located between said passage-way and the door on the rear vestibule, said partition having a movable portion to permit the exit of a passenger directly from said passage-way to the door of said compartment, and having doors located between the compartment containing the seats and the front vestibule.

Signed at New York city in the county of New York and State of New York this 7th day of March A. D. 1910.

TRAUGOTT J. MUELLER.

Witnesses:
FRANK M. ASHLEY,
JOHN D. COOLEY.